(12) United States Patent
Kim et al.

(10) Patent No.: US 9,382,974 B2
(45) Date of Patent: Jul. 5, 2016

(54) AUTOMATED MANUAL TRANSMISSION

(71) Applicant: Hyundai Motor Company, Seoul (KR)

(72) Inventors: Chon Ok Kim, Yongin-Si (KR); Soon Ki Eo, Ansan-Si (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/540,897

(22) Filed: Nov. 13, 2014

(65) Prior Publication Data

US 2016/0003327 A1 Jan. 7, 2016

(30) Foreign Application Priority Data

Jul. 2, 2014 (KR) .......................... 10-2014-0082672

(51) Int. Cl.
*F16H 3/08* (2006.01)
*F16H 3/091* (2006.01)
*F16H 3/00* (2006.01)

(52) U.S. Cl.
CPC ................. *F16H 3/091* (2013.01); *F16H 3/006* (2013.01); *F16H 2003/0822* (2013.01); *F16H 2003/0826* (2013.01); *F16H 2200/0047* (2013.01)

(58) Field of Classification Search
CPC . F16H 3/006; F16H 2003/0931; F16H 3/091; F16H 47/02
USPC ..................................... 74/330, 331, 333, 340
See application file for complete search history.

(56) References Cited

U.S. PATENT DOCUMENTS

| | | | | |
|---|---|---|---|---|
| 4,576,063 A * | 3/1986 | Akashi | .................... | F16H 3/006 74/331 |
| 5,186,065 A * | 2/1993 | Downs | .................... | F16H 3/091 74/331 |
| 7,021,169 B2 * | 4/2006 | Kobayashi | .............. | F16H 3/006 74/330 |
| 7,340,973 B2 * | 3/2008 | Hiraiwa | .................. | F16D 21/04 74/330 |
| 8,677,860 B2 * | 3/2014 | Nishida | ................. | B60W 10/30 74/665 B |
| 2013/0345018 A1 | 12/2013 | Kaltenbach et al. | | |

FOREIGN PATENT DOCUMENTS

| | | |
|---|---|---|
| JP | 2007-534899 A | 11/2007 |
| JP | 2012-505352 A | 3/2012 |
| KR | 10-2006-0013549 A | 2/2006 |
| KR | 10-2010-0064719 A | 6/2010 |
| KR | 10-2012-0108627 A | 10/2012 |
| WO | WO 2005/068876 A1 | 7/2005 |
| WO | WO 2007/042109 A1 | 4/2007 |
| WO | WO 2010/040436 A1 | 4/2010 |

\* cited by examiner

*Primary Examiner* — Ha D Ho
(74) *Attorney, Agent, or Firm* — Morgan, Lewis & Bockius LLP

(57) ABSTRACT

An automated manual transmission may include a hollow input shaft connected to a first clutch and a second clutch so as to be selectively interruptible and selectively receive power from the first or second clutch. The transmission may also include an output shaft provided with a first plurality of shift gears, and an idler shaft provided with a second plurality of shift gears to receive power from the first clutch and to shift gears, with a first idler gear provided on the idler shaft. The transmission may further include a second idler gear connecting the first idler gear to a shift gear in the first plurality of shift gears provided on the output shaft to receive power from the second clutch.

6 Claims, 6 Drawing Sheets

AUTOMATED MANUAL TRANSMISSION

CROSS-REFERENCE TO RELATED APPLICATION

The present application claims priority of Korean Patent Application Number 10-2014-0082672 filed on Jul. 2, 2014, the entire contents of which application are incorporated herein for all purposes by this reference.

BACKGROUND OF INVENTION

1. Field of Invention

The present invention relates generally to automated manual transmissions and, more particularly, to an automated manual transmission which optimizes the realization of a first-speed gear ratio.

2. Description of Related Art

Generally, transmissions for vehicles are classified into manual transmissions (MTs) and automatic transmissions (ATs).

Automatic transmissions are operated in such a way that rotational torque and speed are automatically changed. Typically, the flow of fluid is used in interrupting power or increasing the torque. Such an automatic transmission automatically shifts gears in a predetermined gear shifting pattern depending both on the speed of a vehicle and on the degree by which an accelerator pedal is pressed.

Manual transmissions are operated in such a way that a driver manually shifts gears. To shift gears, a clutch separates a shift actuator from an engine. In this state, gears are shifted. After gear shifting is completed, power is transmitted again through the clutch.

Meanwhile, to improve manual transmissions, automated manual transmissions (AMTs) in which a clutch and a gearshift lever are automatically manipulated have been developed and are in use.

Such automated manual transmissions use the structure of a typical manual transmission as it is and automatically control the clutch and the gearshift lever using a hydraulic control unit. Therefore, automated manual transmissions can be called next generation transmissions that have not only the advantages of manual transmissions, which can provide high fuel efficiency and are relatively inexpensive, but also the advantages of automatic transmissions, which can facilitate shifting of gears.

In automated manual transmissions, a clutch interrupts power during a process of shifting gears. Given this, automated manual transmissions are problematic in that the shift quality deteriorates while power is interrupted.

Particularly, the above problem becomes more obvious when a vehicle moves at a low speed than when it moves at a high speed. Recently, to overcome the above problem, improved automated manual transmissions using two clutches have been proposed.

As shown in FIGS. 1 and 2, an automated manual transmission using two clutches is designed in such a way that: a first clutch C1 and a second clutch C2 are connected to each other by a hollow input shaft I; and power to the first-speed gear, third to seventh-speed gears and R (reverse) gear is obtained using power transmitted from the first clutch C1, and power to the second-speed gear is obtained from the second clutch C2.

The automated manual transmission using two clutches requires two synchronizers S1 and S2. A first output shaft 01 and a second output shaft 02 are placed out of a center line of the input shaft I and a differential gear DG. Hence, there is a problem in that the distance between the input shaft I and the output shafts 01 and 02 and the distance between the output shafts 01 and 02 and a central shaft of the differential gear DG are increased.

Furthermore, when the hollow input shaft I is used, the size of a first-speed drive gear D1 is increased. To form a suitable gear ratio, the size of a first-speed shift gear G1 must also be increased. The distances between the shafts are further increased. An increase in the size of the gears increases the weight of the entire transmission.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art and/or other problems, and the present invention is to provide an automated manual transmission which optimizes the realization of a first-speed gear ratio, and minimizes the distance between shafts.

In various aspects, the present invention provides an automated manual transmission, including: a hollow input shaft connected to a first clutch and a second clutch so as to be selectively interruptible, the hollow input shaft selectively receiving power from the first or second clutch; an output shaft provided with a first plurality of shift gears; an idler shaft provided with a second plurality of shift gears to receive power from the first clutch and to shift gears, with a first idler gear provided on the idler shaft; and a second idler gear connecting the first idler gear to a shift gear in the first plurality of shift gears provided on the output shaft to receive power from the second clutch.

A first synchronizer may be provided between a pair of shift gears in the first plurality of shift gears provided on the output shaft that directly receive power from the input shaft, the second plurality of shift gears provided on the idler shaft may comprise a pair of shift gears, and a second synchronizer is provided between the pair of shift gears in the second plurality of shift gears provided on the idler shaft.

The automated manual transmission may further include a differential gear engaging with the output shaft. The input shaft, the output shaft and a central shaft of the differential gear may be disposed on the same plane.

A first drive gear, a second drive gear, a third drive gear, a fourth drive gear and a fifth drive gear may be provided on the input shaft. A first-speed shift gear and a third-speed shift gear are provided on the idler shaft, wherein the first-speed shift gear engages with the first drive gear, and the third-speed shift gear may engage with the third drive gear. The first synchronizer may be disposed between the first-speed shift gear and the third-speed shift gear. A second-speed shift gear, a fourth-speed shift gear and a fifth-speed shift gear may be provided on the output shaft, wherein the second-speed shift gear engages with the second drive gear, the fourth-speed shift gear engages with the fourth drive gear, and the fifth-speed shift gear engages with the fifth drive gear. The second synchronizer may be disposed between the fourth-speed shift gear and the fifth-speed shift gear, wherein the second-speed shift gear receives power from the second clutch.

A reverse drive gear may be further provided on the input shaft. The automated manual transmission may further include a reverse idler gear transmitting power to the idler shaft through the reverse drive gear.

The automated manual transmission may further include a reverse idler shaft provided with an R(reverse)-speed gear. A third synchronizer may be further provided on the reverse idler shaft, and an R-speed drive gear may be further provided on the input shaft, the R-speed drive gear engaging with the reverse idler gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
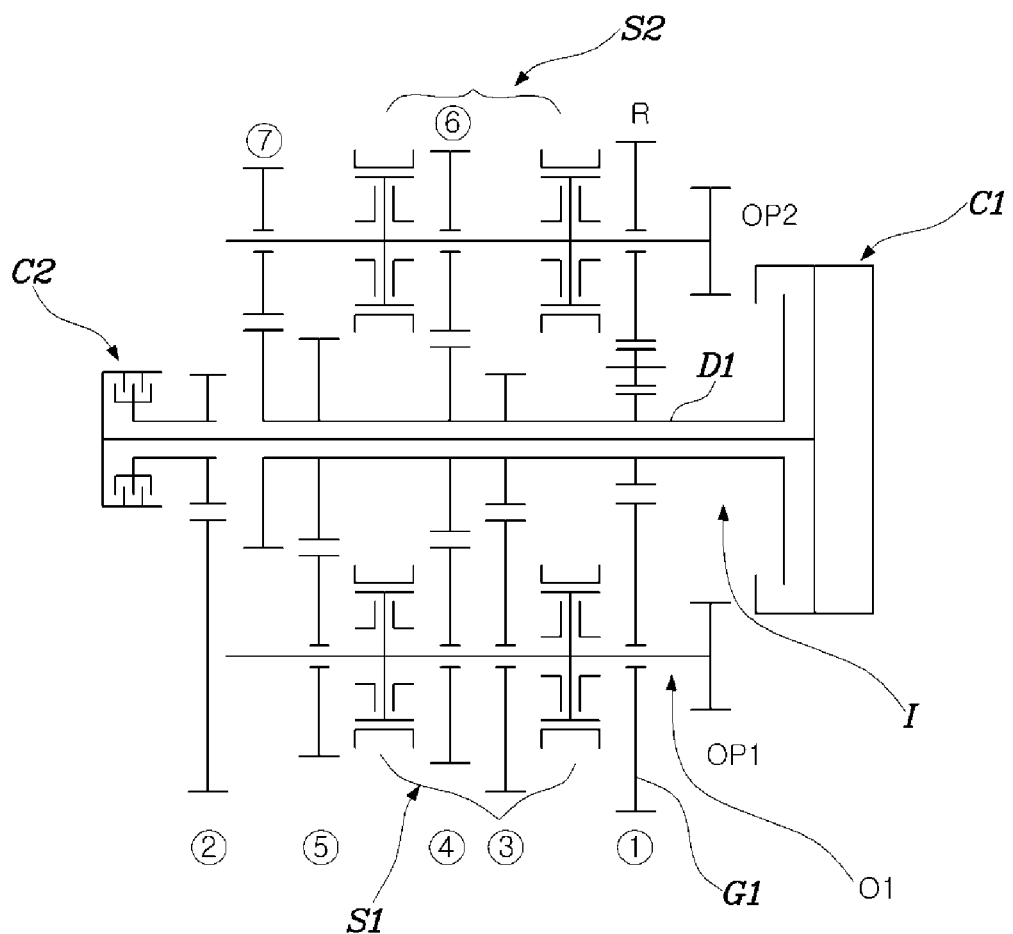
FIG. 1 is a view illustrating the construction of a conventional automated manual transmission for vehicles.
Figure 2:
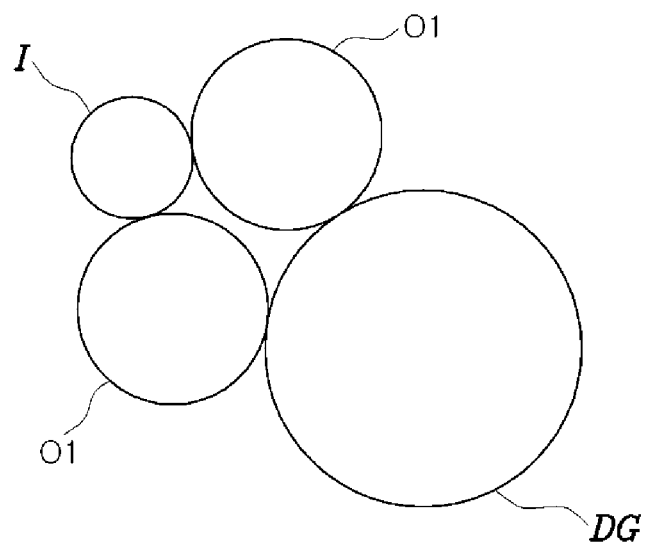
FIG. 2 is a view showing the conventional automated manual transmission from an axial direction.
Figure 3:
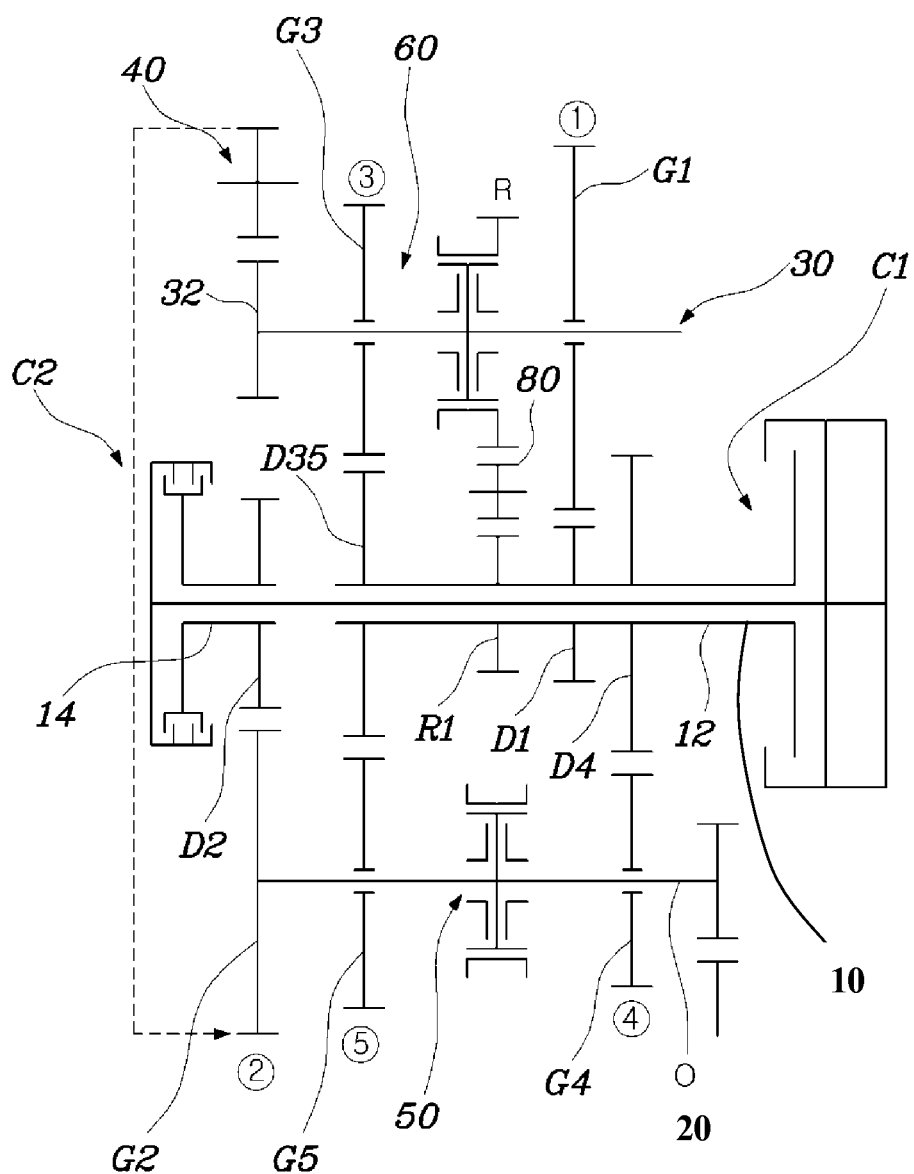
FIG. 3 is a view illustrating the construction of an exemplary automated manual transmission for vehicles, according to the present invention.
Figure 4:
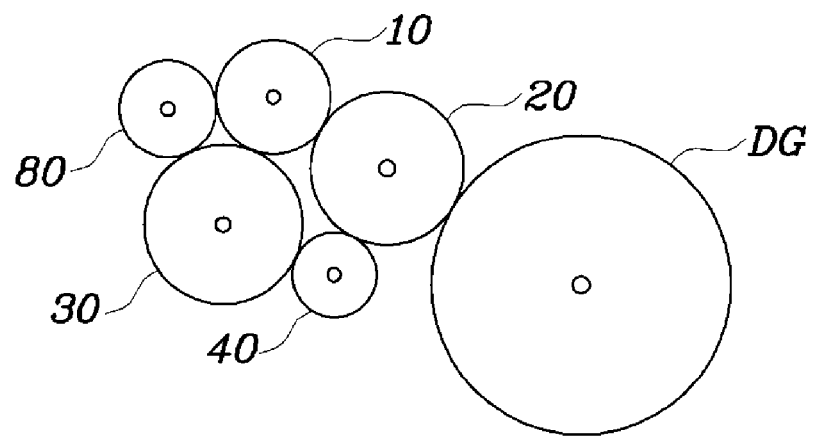
FIG. 4 is a view showing an exemplary automated manual transmission from an axial direction according to the present invention.

As shown in FIGS. 3 and 4, an automated manual transmission according to the present invention includes: a hollow input shaft 10 which is connected to a first clutch C1 and a second clutch C2 so as to be selectively interruptible and thus receives power from the first or second clutch C1 or C2; an output shaft 20 which is provided with a plurality of shift gears G2, G4 and G5; an idler shaft 30 which is provided with a plurality of shift gears G1 and G3 to receive power from the first clutch C1 and shift gears and is provided with a first idler gear 32; and a second idler gear 40 which connects the first idler gear 32 to, of the shift gears G2, G4 and G5 provided on the output shaft 20, the shift gear G2 that receives power from the second clutch C2.

The input shaft 10 includes a first input shaft 12 which is connected to the first clutch C1 for use in transmitting power, and a second input shaft 14 which is separately provided from the first input shaft 12 and independently receives power from the second clutch C2.

Figure 5A:
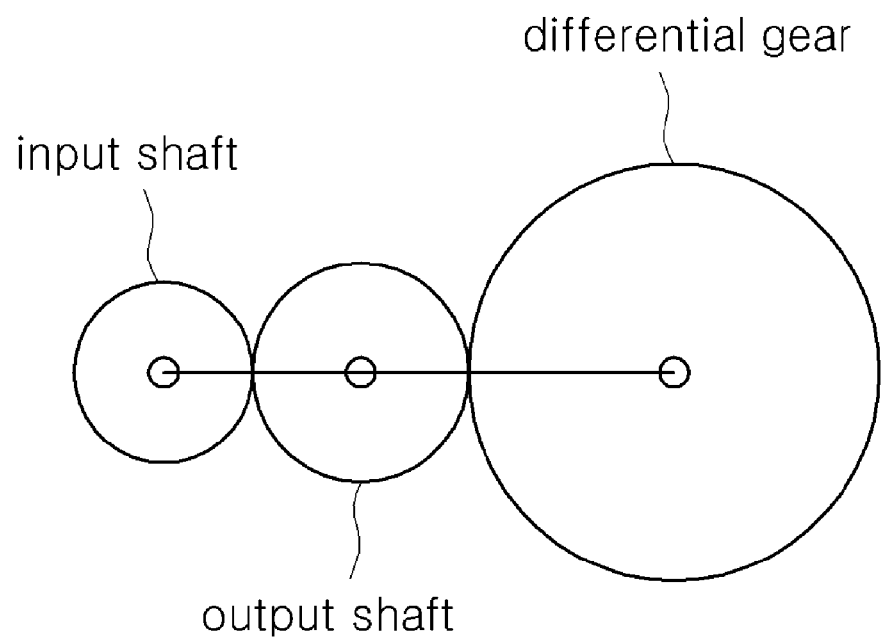
FIG. 5A is a view showing a conventional two-shaft transmission from an axial direction.
Figure 5B:
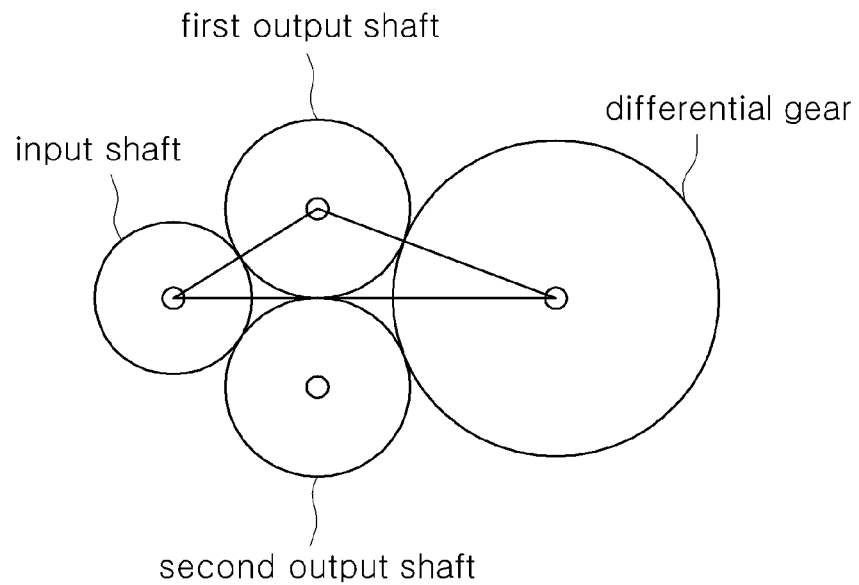
FIG. 5B is a view showing a conventional three-shaft transmission when viewed from an axial direction.
Figure 5C:
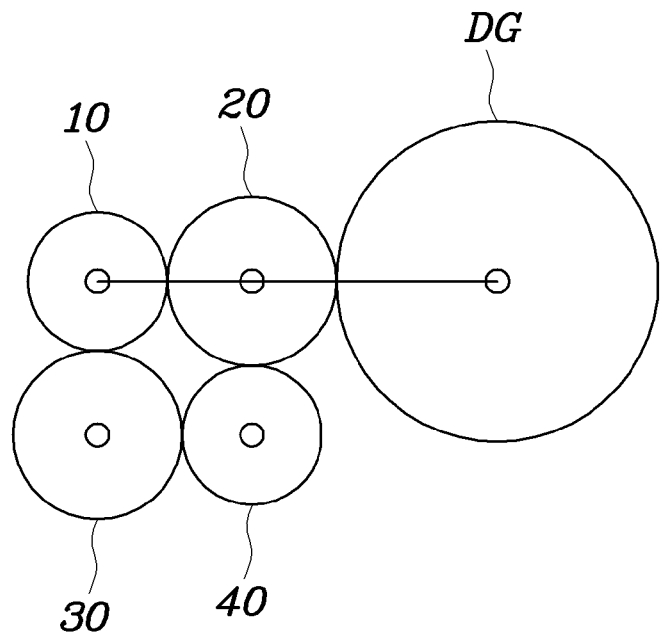
FIG. 5C is a schematic view showing an exemplary transmission from an axial direction according to the present invention.

As shown in FIGS. 5A, 5B and 5C, transmissions are classified into two-shaft transmissions and three-shaft transmissions.

Two-shaft transmissions are advantageous in that because an input shaft, an output shaft and a central shaft of a differential gear are aligned with each other, the distance between the shafts can be minimized. However, there is a disadvantage in that it is difficult to increase the number of gear stages.

Three-shaft transmissions have an advantage of being able to remedy the disadvantage of the two-shaft transmissions.

However, given the fact that the input shaft and the differential gear must be fixed in place in terms of vehicle design, the two output shafts must be spaced apart from each other by a predetermined distance to avoid interference between synchronizers which are respectively installed parallel to the output shafts. Therefore, there is a problem in that not only the distance between the input shaft and the output shafts but also the distance the output shafts and the shaft of the differential gear is increased.

Meanwhile, the present invention is characterized in that the degree of freedom in position of the idler shaft 30 can be improved by means of the idler shaft 30 and the idler gears 32 and 40, and the distances between shafts can be minimized while avoiding interference between the synchronizers.

As shown in FIGS. 3 and 4, the idler shaft 30 of the automated manual transmission according to the present invention receives power from the input shaft 10 and transmits the power to the output shaft 20 via the first idler gear 32.

The first clutch C1 and the second clutch C2 selectively interrupt power and respectively and selectively transmit the power to the first input shaft 12 and the second input shaft 14. While power is transmitted from the first clutch C1, power is not transmitted from the second clutch C2. Thus, in this case, power is transmitted only to the first input shaft 12. While power is transmitted from the second clutch C2, power is not transmitted from the first clutch C1. In this case, power is thus transmitted only to the second input shaft 14.

In the present invention, given that the single output shaft 20 is present, the layout of the elements is optimized such that power transmitted from the first clutch C1 is transmitted to the output shaft 20 via the first input shaft 12 and the idler shaft 30, and power transmitted from the second clutch C2 is directly transmitted to the output shaft 20 via the second input shaft 14.

Particularly, in the present invention, the idler shaft 30 is installed, and a first-speed shift gear G1 is provided on the idler shaft 30, whereby a first-speed gear ratio can be easily embodied even in the hollow input shaft 10.

Although a five-speed transmission will be described as an example for the sake of explanation, the number of gear stages (speeds), as needed according to the intention of a designer, can be appropriately adjusted within the scope and spirit of the present invention. Provided on the idler shaft 30 and the output shaft 20, gear stages can also be appropriately adjusted in position according to the intention of a designer.

The shift gears G1, G2, G3, G4 and G5 are provided on the output shaft 20 and the idler shaft 30. High-speed shift gears are provided on the output shaft 20, and low-speed shift gears are provided on the idler shaft 30. For instance, a fourth-speed shift gear G4 and a fifth-speed shift gear G5 may be provided on the output shaft 20, and the first-speed shift gear G1 and a third-speed shift gear G3 may be provided on the idler shaft 30.

Because the first-speed shift gear G1 is installed on the idler shaft 30 and the idler shaft 30 can form gear ratios using the first idler gear 32 and the second idler gear, there is an advantage in that embodiments of gear ratios can be facilitated.

A first synchronizer 50 is provided between the fourth-speed shift gear G4 and the fifth-speed shift gear G5 which are installed on the output shaft 20. A second synchronizer 60 is provided between the first-speed shift gear G1 and the third-speed shift gear G3 which are installed on the idler shaft 30.

As such, when the idler shaft 30 is used, it becomes possible to use only the single output shaft 20, and only one pair of synchronizers 50 and 60 are needed in transmitting power. Therefore, the distance between the shafts can be minimized, as mentioned above.

Respectively corresponding to the first- to fifth-speed shift gears G1 through G5, a first drive gear D1, a second drive gear D2, a third drive gear D35, a fourth drive gear D4 and a fifth drive gear D35 are provided on the input shaft I.

The first drive gear D1 engages with the first-speed shift gear G1. The second drive gear D2 engages with the second-speed shift gear G2. The third drive gear D35 engages with the third-speed shift gear G3. The fourth drive gear D4 engages with the fourth-speed shift gear G4. The fifth drive gear D35 engages with the fifth-speed shift gear G5.

The third drive gear D35 and the fifth drive gear D35 can be embodied using a single drive gear by adjusting a gear ratio.

Hereinafter, the operation of the automated manual transmission according to the present invention will be explained with reference to the drawings. In the following description of the operation of the automated manual transmission, it is assumed that ①, ②, ③, ④ and ⑤ respectively denote first through fifth speeds.

As shown in FIG. 3, in first speed, power transmission to the second clutch C2 is interrupted, and power is transmitted only through the first clutch C1. When power is transmitted to the first input shaft 12 through the first clutch C1, the second synchronizer 60 synchronizes the first drive gear D1 with the first-speed shift gear G1.

Because of the above-mentioned synchronization, power transmitted to the idler shaft 30 is transmitted to the output shaft 20 via the first idler gear 32, the second idler gear 40 and the second-speed shift gear G2.

In third speed, power transmission to the second clutch C2 is interrupted, and power is transmitted only through the first clutch C1. When power is transmitted to the first input shaft 12 through the first clutch C1, the second synchronizer 60 synchronizes the third drive gear D35 with the third-speed shift gear G3.

Because of the above-mentioned synchronization, power transmitted to the idler shaft 30 is transmitted to the output shaft 20 via the first idler gear 32, the second idler gear 40 and the second-speed shift gear G2.

In R (reverse) speed, power transmission to the second clutch C2 is interrupted, and power is transmitted only through the first clutch C1. In this case, a reverse idler gear 80 moves and engages with a reverse drive gear R1 provided on the first input shaft 12, and a sleeve is put on the reverse idler gear 80. Then, power is transmitted to the idler shaft 30. Ultimately, the power is transmitted to the output shaft 20 through the first idler gear 32, the second idler gear 40 and the second-speed shift gear G2. This refers to a selective-mesh type.

In second speed, power transmission to the first clutch C1 is interrupted, and power is transmitted only through the second clutch C2. The second-speed shift gear G2 provided on the output shaft 20 directly transmits power to the output shaft 20 rather than being synchronized, by a separate synchronizer, with the second drive gear D2 installed on the second input shaft 14.

In fourth speed, power transmission to the second clutch C2 is interrupted, and power is transmitted only through the first clutch C1. When power is transmitted to the first input shaft 12 through the first clutch C1, the first synchronizer 50 synchronizes the fourth drive gear D4 with the fourth-speed shift gear G4, and the power is transmitted to the output shaft 20.

In fifth speed, power transmission to the second clutch C2 is interrupted, and power is transmitted only through the first clutch C1. When power is transmitted to the first input shaft 12 through the first clutch C1, the first synchronizer 50 synchronizes the fifth drive gear D35 with the fifth-speed shift gear G5, and the power is transmitted to the output shaft 20.

Figure 6:
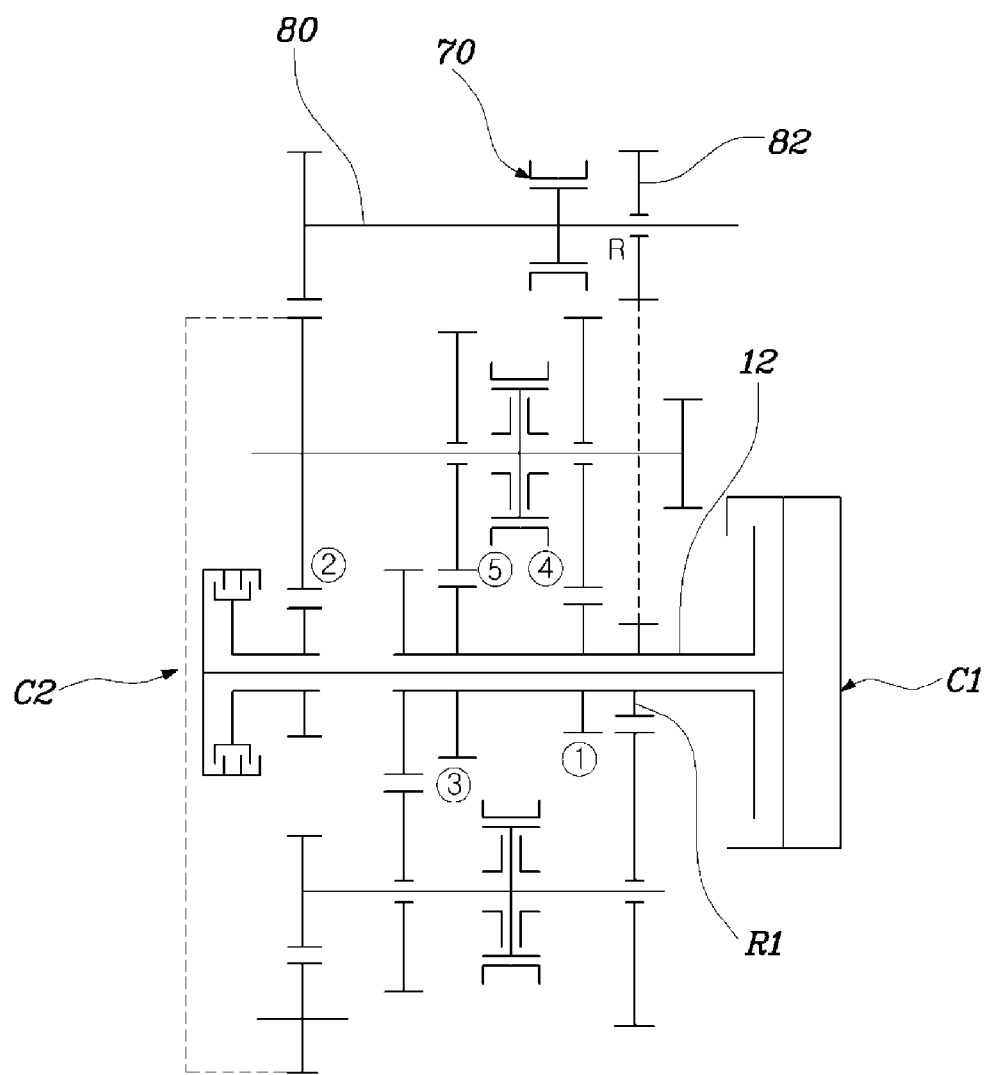
FIG. 6 is a view illustrating a constant-mesh type power transmission process of an exemplary transmission when in R speed according to the present invention.

Meanwhile, as shown in FIG. 6, if the automated manual transmission further includes a reverse idler gear 82 and a reverse idler shaft 80 provided with a third synchronizer 70, R speed can be embodied in a constant-mesh manner.

An R-speed drive gear R1 provided on the first input shaft 12 engages both with the reverse idler gear 82 provided on the reverse idler shaft 30 and with the output shaft 20 in a constant-mesh manner. Therefore, when the R-speed drive gear R1 is synchronized with the reverse idler gear 82 by the third synchronizer 70, reverse speed is obtained.

As described above, the present invention having the above-mentioned technical construction can provide the following effects.

First, in first speed, a change of velocity can be conducted in two stages. Thus, there is an advantage of making it easy to embody a first-speed gear ratio. Second, gear ratios of the transmission can be embodied without the distance between shafts being increased. Third, synchronizers can be provided parallel to the shafts without the distance between shafts being increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission, comprising:
   a hollow input shaft connected to a first clutch and a second clutch so as to be selectively interruptible, the hollow input shaft selectively receiving power from the first or second clutch;
   an output shaft provided with a first plurality of shift gears;
   an idler shaft provided with a second plurality of shift gears to receive power from the first clutch and to shift gears, with a first idler gear provided on the idler shaft; and
   a second idler gear connecting the first idler gear to a shift gear in the first plurality of shift gears provided on the output shaft to receive power from the second clutch.

2. The automated manual transmission as set forth in claim 1, wherein:
a first synchronizer is provided between a pair of shift gears in the first plurality of shift gears provided on the output shaft that directly receive power from the input shaft,
the second plurality of shift gears provided on the idler shaft comprise a pair of shift gears, and
a second synchronizer is provided between the pair of shift gears in the second plurality of shift gears provided on the idler shaft.

3. The automated manual transmission as set forth in claim 1, further comprising
a differential gear engaging with the output shaft,
wherein the input shaft, the output shaft and a central shaft of the differential gear are disposed on a same plane.

4. The automated manual transmission as set forth in claim 1, wherein:
a first drive gear, a second drive gear, a third drive gear, a fourth drive gear and a fifth drive gear are provided on the input shaft,
a first-speed shift gear and a third-speed shift gear are provided on the idler shaft, wherein the first-speed shift gear engages with the first drive gear, and the third-speed shift gear engages with the third drive gear,
a first synchronizer is disposed between the first-speed shift gear and the third-speed shift gear,
a second-speed shift gear, a fourth-speed shift gear and a fifth-speed shift gear are provided on the output shaft, wherein the second-speed shift gear engages with the second drive gear, the fourth-speed shift gear engages with the fourth drive gear, and the fifth-speed shift gear engages with the fifth drive gear, and
a second synchronizer is disposed between the fourth-speed shift gear and the fifth-speed shift gear, wherein the second-speed shift gear receives power from the second clutch.

5. The automated manual transmission as set forth in claim 4, wherein a reverse drive gear is further provided on the input shaft, the automated manual transmission further comprising:
a reverse idler gear transmitting power to the idler shaft through the reverse drive gear.

6. The automated manual transmission as set forth in claim 4, further comprising:
a reverse idler shaft provided with an R(reverse)-speed gear,
wherein a third synchronizer is further provided on the reverse idler shaft, and an R-speed drive gear is further provided on the input shaft, the R-speed drive gear engaging with the reverse idler gear.

* * * * *